United States Patent [19]

Sakakiyama

[11] Patent Number: 4,669,591

[45] Date of Patent: Jun. 2, 1987

[54] SYSTEM FOR CONTROLLING THE CLUTCH TORQUE OF AN ELECTROMAGNETIC CLUTCH FOR VEHICLES

[75] Inventor: Ryuzo Sakakiyama, Tokyo, Japan

[73] Assignees: Fuji Jukogyo Kabushiki Kaisha, Tokyo, Japan; Van Doorne's Transmissie B.V., Tilburg, Netherlands

[21] Appl. No.: 685,282

[22] Filed: Dec. 24, 1984

[30] Foreign Application Priority Data

Dec. 27, 1983 [JP] Japan .................. 58-251022

[51] Int. Cl.⁴ .................................. F16D 37/02
[52] U.S. Cl. .................. 192/0.076; 192/21.5; 192/103 R
[58] Field of Search ........... 192/0.033, 0.076, 0.096, 192/21.5, 103 R

[56] References Cited

U.S. PATENT DOCUMENTS

| | | | |
|---|---|---|---|
| 2,896,757 | 7/1959 | Palys | 192/0.076 X |
| 3,335,829 | 8/1967 | De Coye De Castalet | 192/0.033 |
| 3,402,793 | 9/1968 | Scholl | 192/0.033 |
| 4,449,617 | 5/1984 | Sakakiyama et al. | 192/0.033 |
| 4,494,641 | 1/1985 | Sakakiyama | 192/0.076 |

FOREIGN PATENT DOCUMENTS

| | | | |
|---|---|---|---|
| 0015023 | 1/1982 | Japan . | |
| 0079338 | 5/1982 | Japan | 192/0.076 |
| 2071803 | 9/1981 | United Kingdom | 192/21.5 |

Primary Examiner—Rodney H. Bonck
Assistant Examiner—Richard M. Lorence
Attorney, Agent, or Firm—Martin A. Farber

[57] ABSTRACT

A system for controlling clutch torque for a vehicle which has a transmission and an electromagnetic clutch provided between an engine and the transmission, the clutch current being increasing with increase of engine speed. The system comprises an engine speed sensor for sensing the speed of the engine and for producing an engine speed signal in proportion to the engine speed, and an acceleration detecting switch for producing an acceleration signal.

A vehicle speed detecting unit is provided for sensing the vehicle speed and for producing an output when the vehicle speed reaches a predetermined value at a low engine speed.

A clutch current control unit is provided to respond to the output of the vehicle speed detecting unit and to the acceleration signal for increasing the clutch current along at an inclination up to a rated current.

10 Claims, 6 Drawing Figures

SYSTEM FOR CONTROLLING THE CLUTCH TORQUE OF AN ELECTROMAGNETIC CLUTCH FOR VEHICLES

BACKGROUND OF THE INVENTION

The present invention relates to a system for controlling the clutch torque of an electromagnetic clutch disposed between an engine and the transmission of a motor vehicle.

A clutch torque control system for starting of a vehicle is, for example, disclosed in Japanese Patent Laid Open No. 57-15023. In the system, the clutch current flowing in a coil of the clutch exponentially increases with respect to an increase of the engine speed for starting the vehicle. When vehicle speed reaches a predetermined speed (for example 20 km/h), a rated current (lock-up current) flows through the coil, so that the clutch is fully engaged. During deceleration of the vehicle, when the vehicle speed decreases below the predetermined speed, the clutch current is cut off to disengage the clutch.

Referring to FIG. 5 showing a clutch torque characteristic of an electromagnetic clutch, when the clutch torque exceeds a stall point P on a clutch torque line l, the clutch is substantially engaged. On the other hand, when the speed of the vehicle reaches a predetermined value (20 km/h), the clutch is engaged. If the rated current flows at a point Q above the stall point P, the clutch is smoothly engaged without a shock. However, in a transmission system combining an electromagnetic clutch with a belt-drive infinitely variable transmission, the transmission ratio is changed to a lower value, when the magnitude of depression of an accelerator pedal is small, which means a low engine speed and a low clutch torque. In such a system, when the speed of the vehicle exceeds the predetermined value at a low transmission ratio, the clutch is engaged from a low clutch torque point Q' below the stall point P. Accordingly, the clutch torque rises from the point Q' as shown by the dashed line. Since the clutch torque rapidly rises from a low clutch torque state and hence the clutch is rapidly engaged, a large shock occurs in the system, which causes undesirable problems for the vehicle.

SUMMARY OF THE INVENTION

The object of the present invention is to provide a system which controls the clutch current so as to gradually engage an electromagnetic clutch to prevent the occurrence of shock caused by a rapid engagement of the clutch at low engine speed.

In accordance with the present invention, there is provided a system for controlling the clutch torque for a vehicle having an engine, a transmission, and an electromagnetic clutch provided between the engine and the transmission, the clutch current being increased with increasing of engine speed.

The system comprises vehicle speed detecting means for sensing the vehicle speed and producing an output when the vehicle speed reaches a predetermined speed, and means responsive to the output of the vehicle speed detecting means for increasing the clutch current along an inclination up to a rated current.

The other objects and features of this invention will be apparently understood from the following description with reference to the accompanying drawings.

DETAILED DESCRIPTION OF THE PREFERRED EMBODIMENT

Figure 1:
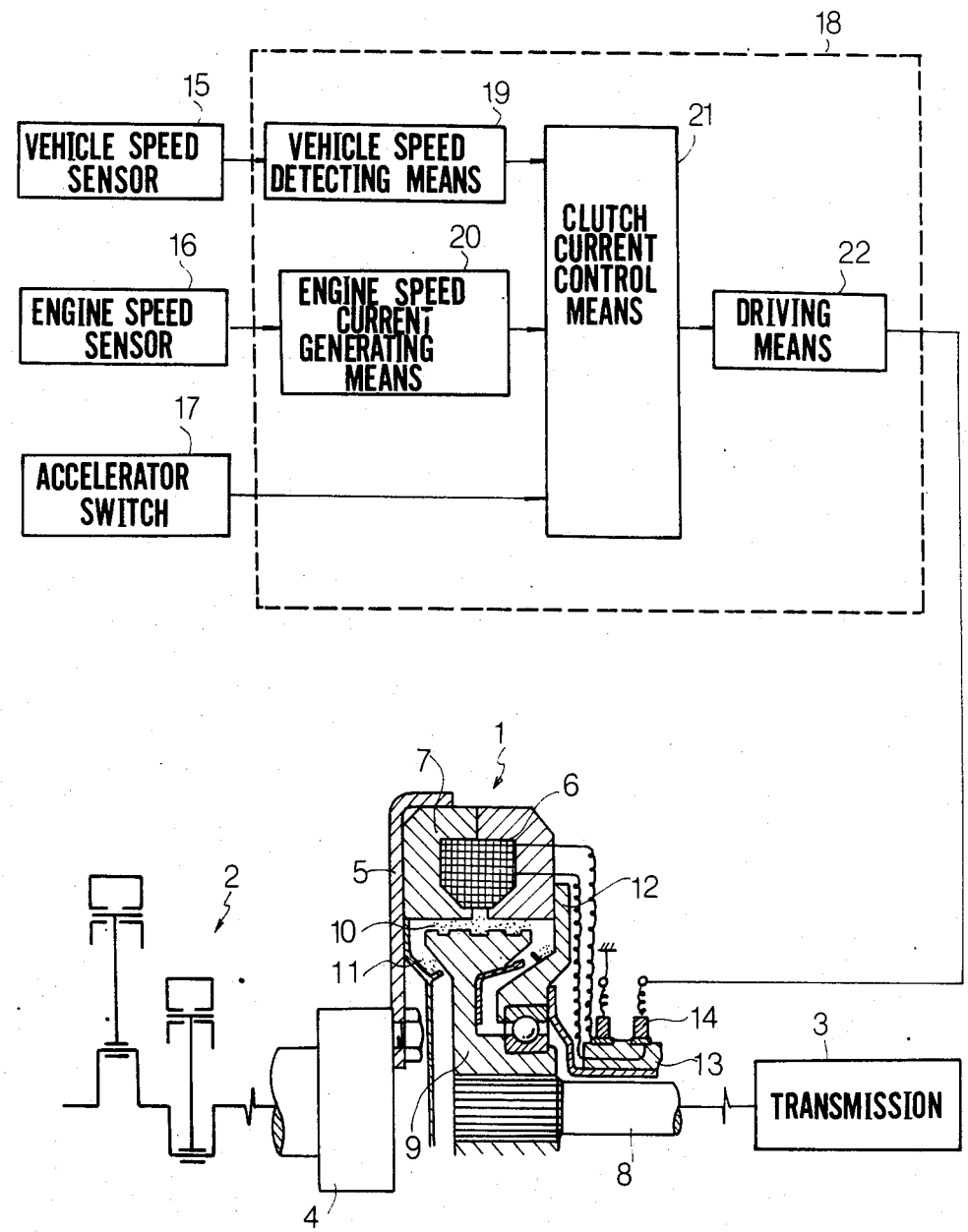
FIG. 1 is a schematic diagram showing an embodiment of the present invention.

Referring to FIG. 1, an electromagnetic powder clutch 1 is provided for transmitting power of an engine 2 to wheels (not shown) of a vehicle through a belt-drive infinitely variable transmission 3. The electromagnetic powder clutch 1 comprises a drive member 7 connected to a crankshaft 4 of the engine 2 through a drive plate 5, a coil 6 provided in the drive member 7, a driven member 9 having its outer periphery spaced from the inner periphery of the drive member 7 by a gap 10, and a powder chamber 11 defined between the drive member 7 and driven member 9. The powder chamber 11 is filled with magnetic powder. The driven member 9 is secured to an input shaft 8 of the belt-drive infinitely variable transmission 3. A holder 12 secured to the drive member 7 carries slip rings 13 which are electrically connected to the coil 6. The coil 6 is supplied through brushes 14 and slip rings 13 with a clutch current from a control unit 18.

When the magnetizing coil 6 is excited by the clutch current, the drive member 7 is magnetized to produce a magnetic flux passing through the driven member 9. The magnetic powder is aggregated in the gap 10 by the magnetic flux and the driven member 9 is engaged with the drive member 7 by the powder. On the other hand, when the clutch current is cut off, the drive and driven members 7 and 9 are disengaged from one another. The transmission ratio of the belt-drive infinitely variable transmission 3 is determined in dependency on the engine speed and the vehicle speed. When the vehicle speed is lower than a predetermined low value, the transmission ratio is at the highest ratio (i.e. a low gear position). When the engine speed is at high value, the transmission ratio becomes low (i.e. a high gear position).

The control unit 18 comprises a microcomputer which includes a vehicle speed detecting means 19, an engine speed current generating means 20, a clutch current control means 21, and a driving means 22. The vehicle speed detecting means 19 is supplied with a vehicle speed signal from a vehicle speed sensor 15 and produces an output when the vehicle speed exceeds a predetermined value (20 km/h). The engine speed current generating means 20 is supplied with a signal from an engine speed sensor 16 and produces an output proportional to the engine speed. An accelerator switch 17 is provided for producing an output when an accelerator pedal is depressed. The clutch current control means 21 is supplied with outputs from the vehicle speed detecting means 19, the engine speed current generating means 20 and the accelerator switch 17 and produces a clutch current dependent on driving conditions. The clutch current control means 21 operates in accordance with the flow charts of FIGS. 2a and 2b.

Figure 2A:
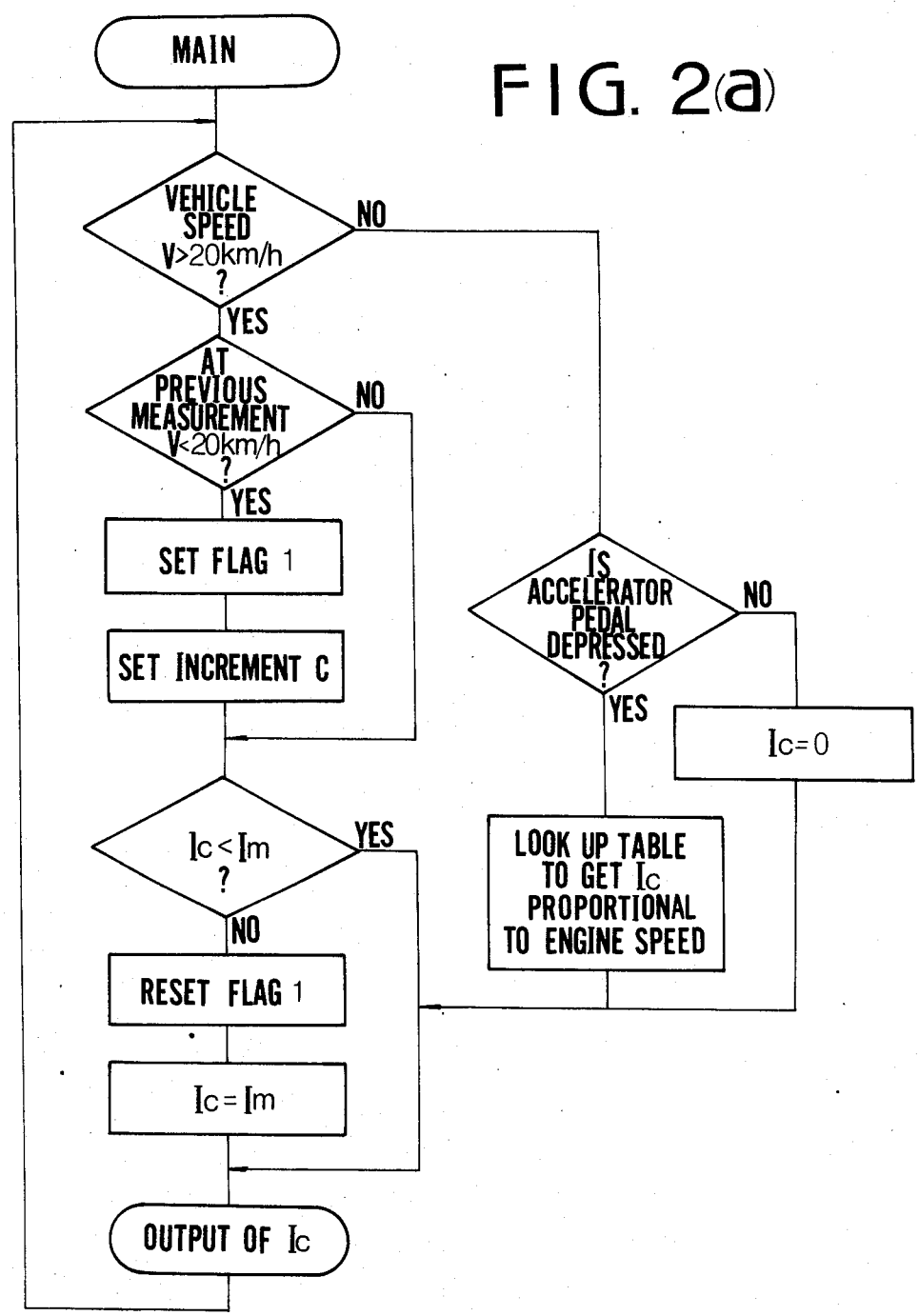
FIGS. 2a and 2b are flow charts showing processes in a microprocessor employed in the system of the present invention.
Figure 2B:
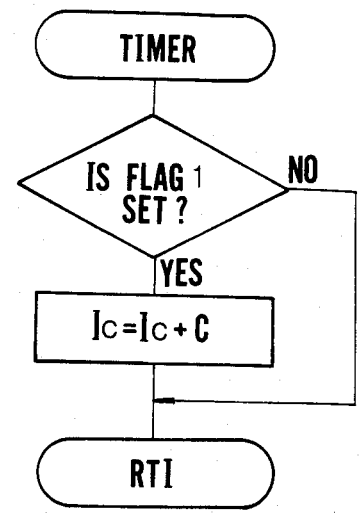
Figure 3:
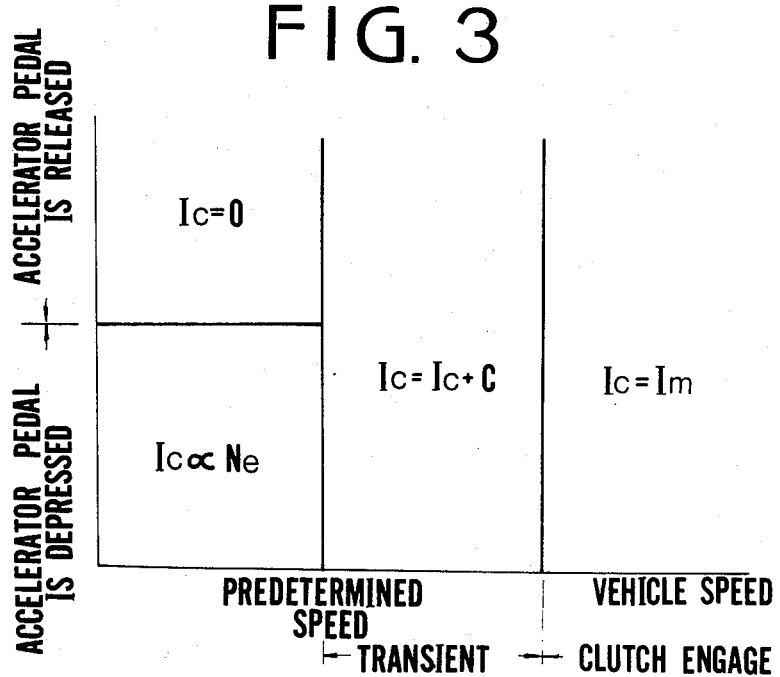
FIG. 3 is a graph showing ranges of clutch current variation.

FIG. 2a is a main routine and FIG. 2b is an interrupt routine. FIG. 3 shows a clutch current variation. The operation of the system is described hereinafter referring to FIGS. 2a, 2b and 3. When the accelerator pedal is not depressed at a low vehicle speed below 20 km/h, the clutch current is zero to disengage the clutch. When the accelerator pedal is depressed, the clutch current increases with an increase of the engine speed in accordance with a look-up table (see FIG. 2(a). When the vehicle speed is higher than the predetermined speed and the previously measured speed is lower than the set speed, a flag 1 is set, which means that the clutch current goes into a transient state. The clutch current is controlled by the interrupt routine of FIG. 2b. That is, a certain current increment C is added to a previous current IC at regular intervals in dependency on a timer. Accordingly, the clutch current gradually increases along an inclination determined by the increment C. Thus, the clutch is gradually engaged in dependency on the clutch current during the transient state. When the clutch current reaches the rated current, the clutch is fully engaged and the flag 1 is reset.

Figure 4:
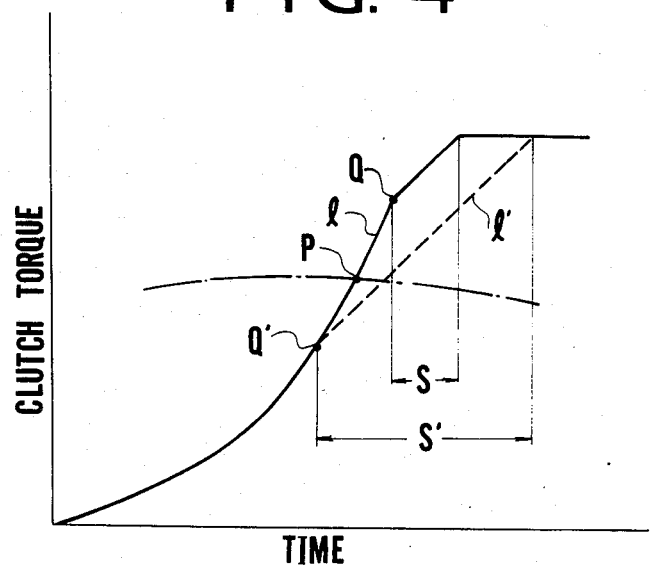
FIGS. 4 and 5 are graphs showing clutch torques in the system of the present invention and in a conventional system.
Figure 5:
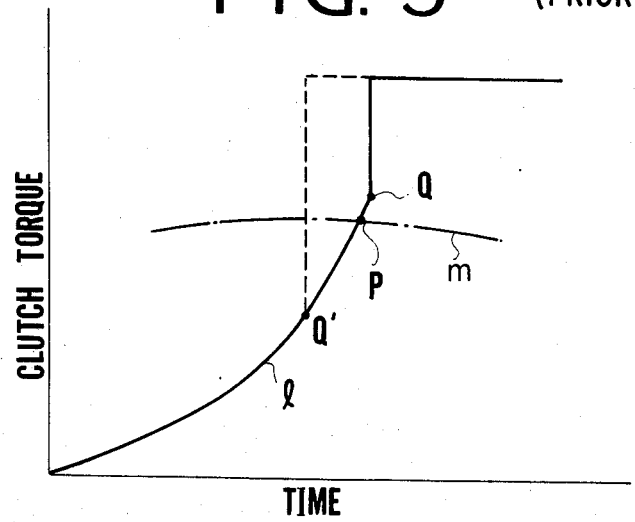

Referring to FIG. 4, a solid line l shows clutch torque when the vehicle speed reaches the set speed at a point Q above the stall point P. When the vehicle speed reaches the predetermined value at a point Q' below the stall point P, the clutch torque gradually increases along an inclination dependent on the increment C as shown by a dotted line l' during the period S' longer than a peiod S of the normal state of the clutch engagement.

From the foregoing, it will be understood that the present invention provides a system which controls the clutch current so as to gradually increase, so that shock caused by the engagement of the clutch can be prevented.

While the presently preferred embodiment of the present invention has been shown and described, it is to be understood that this disclosure is for the purpose of the illustration and that various changes and modifications may be made without departing from the spirit and scope of the invention as set forth in the appended claims.

What is claimed is:

1. In a system for controlling clutch torque of an electromagnetic clutch for a vehicle having an engine and a transmission, the electromagnetic clutch being operatively connected between the engine and the transmission and being supplied with clutch current which increases with increasing of engine speed, the improvement comprising
    first means for sensing the speed of the engine for producing an engine speed signal as a function of the engine speed,
    acceleration detecting means for producing an acceleration signal,
    vehicle speed detecting means for sensing speed of the vehicle and generating an output when the vehicle speed exceeds a predetermined value, and
    second means responsive to said output of said vehicle speed detecting means and to said acceleration signal for increasing the clutch current up to a rated current of the clutch at a rate smaller than a rate which is determined by engine speed at the generation of the output of the vehicle speed detecting means.

2. The system according to claim 1 wherein said first means comprises an engine speed sensor and a engine speed current generating means responsive to the output of the engine speed sensor for producing the engine speed signal.

3. The system according to claim 2 wherein said first and second means comprises a microcomputer.

4. The system as set forth in claim 1, wherein
    said second means is responsive as set forth, further when an immediately previously sensed vehicle speed is lower that said predetermined speed.

5. The system as set forth in claim 1, wherein
    said acceleration detecting means is a switch.

6. The system as set forth in claim 1, wherein
    said first means produces said engine speed signal in proportion to the engine speed.

7. The system as set forth in claim 1, further comprising
    third means including a look-up table for providing increments of increasing clutch current responsive to said engine speed signal.

8. The system as set forth in claim 7, wherein
    said third means is inactivated when said second means becomes responsive as set forth.

9. The system as set forth in claim 1, wherein
    said inclination is linear.

10. In a system for controlling clutch torque of an electromagnetic clutch for a vehicle having an engine and a transmission, the eletromagnetic clutch being operatively connected between the engine and the transmission and being supplied with clutch current which increases with increasing of engine speed, the improvement comprising
    first means for sensing the speed of the engine for producing an engine speed signal as a function of the engine speed,
    acceleration detecting means for producing an acceleration signal,
    vehicle speed detecting means for sensing speed of the vehicle and generating an output when the vehicle speed exceeds a predetermined value, and
    second means responsive to said output of said vehicle speed detecting means and to said acceleration signal for increasing the clutch current along a curve up to a rated current of the clutch to fully engage the clutch at the rated current, said curve having a smaller slope than that of said increasing current which is determined by engine speed at the generation of the output of the vehicle speed detecting means.

* * * * *